(12) United States Patent
Yoshida et al.

(10) Patent No.: US 7,616,388 B2
(45) Date of Patent: Nov. 10, 2009

(54) IMAGE CAPTURE LENS FEEDING DEVICE AND METHOD OF ASSEMBLY OF SAME

(75) Inventors: Toshiyuki Yoshida, Tokyo (JP); Tamio Nishino, Saitama (JP)

(73) Assignees: Milestone Co., Ltd., Tokyo (JP); Satoshi Do, Saitama (JP)

( * ) Notice: Subject to any disclaimer, the term of this patent is extended or adjusted under 35 U.S.C. 154(b) by 379 days.

(21) Appl. No.: 11/629,121

(22) PCT Filed: Jul. 31, 2006

(86) PCT No.: PCT/JP2006/315133

§ 371 (c)(1),
(2), (4) Date: Dec. 11, 2006

(87) PCT Pub. No.: WO2007/122748

PCT Pub. Date: Nov. 1, 2007

(65) Prior Publication Data

US 2008/0291549 A1 Nov. 27, 2008

(30) Foreign Application Priority Data

Apr. 13, 2006 (JP) ............................. 2006-110598

(51) Int. Cl.
*G02B 15/14* (2006.01)
*G02B 7/02* (2006.01)
(52) U.S. Cl. ...................... 359/699; 359/819
(58) Field of Classification Search ......... 359/693–705, 359/819–825
See application file for complete search history.

(56) References Cited

U.S. PATENT DOCUMENTS 5,117,311 A * 5/1992 Nomura ...................... 359/819
6,426,839 B2 * 7/2002 Dou et al. .................... 359/823
6,476,985 B2 * 11/2002 Dou et al. .................... 359/823
7,372,638 B2 * 5/2008 Yoshii et al. ................. 359/699
2005/0111113 A1 5/2005 Shirie

FOREIGN PATENT DOCUMENTS

DE 10 2005 037907 3/2006

(Continued)

OTHER PUBLICATIONS

European Search Report dated Feb. 9, 2009.

*Primary Examiner*—Mohammed Hasan
(74) *Attorney, Agent, or Firm*—Venable LLP; James R. Burdett

(57) ABSTRACT

In a thin image capture lens feeding device, wear can be avoided, even when switching between a normal image capture mode and a macro image capture mode is repeated. A lens retention housing may move back and forth when rotated relative to a holder. The holder, in sliding coupling with the lens retention housing, holds the lens retention housing. Enclosed between a pressing cover and the holder are a spacer, micro-coil spring set, and lens retention housing; by coupling the pressing cover and the holder by claw portions, an integrated image capture lens feeding device is assembled. The spacer and lens retention housing are integrated by a linking hole and linking rod, configured such that the lens retention housing and the spacer rotate simultaneously by the same amount, so that wear at the contact portions between the spring means and spacer is avoided.

11 Claims, 6 Drawing Sheets

FOREIGN PATENT DOCUMENTS

| | | |
|---|---|---|
| EP | 1 248 131 | 10/2002 |
| EP | 1 560 054 | 8/2005 |
| JP | 3-33421 | 4/1991 |
| JP | 10-170809 | 6/1998 |
| JP | 2003-337279 | 11/2003 |
| JP | 2004-304565 | 10/2004 |
| JP | 200-043857 | 2/2005 |
| JP | 2005-157290 | 6/2005 |
| JP | 2005-189415 | 7/2005 |
| JP | 3118255 | 12/2005 |
| JP | 2006-039480 | 2/2006 |
| WO | WO-2004/107007 | 12/2004 |

* cited by examiner (A)

(B)

(A)

(B)

IMAGE CAPTURE LENS FEEDING DEVICE AND METHOD OF ASSEMBLY OF SAME

TECHNICAL FIELD

The present invention relates to an image capture lens feeding device, to move the image capture lens mounted on optical equipment in the direction perpendicular to the imaging area, and in particular relates to an image capture lens feeding device which comprises a mechanism for switching between an ordinary image capture mode and a macro image capture mode, and which is thin, and affords excellent wear resistance of constituent members, as well as a method of assembly of same.

BACKGROUND ART

Macro image capture lens feeding devices have been developed (see Patent Document 1) for use in conventional optical equipment using CCDs (Charge Coupled Devices) or CMOS (Complementary Metal Oxide Semiconductor) devices as image capture elements, with the aim of for example reducing the number of parts, decreasing the equipment size, reducing the amount of rotation operation to perform image capture mode switching operations, and improve operability. Such macro image capture lens feeding devices comprise a holder into which is incorporated an image capture element, an elastic member to prevent shaking of the image capture lens, a feeding ring, a lens barrel incorporating a lens group which comprises the image capture lens, and an operation knob.

In the macro image capture lens feeding device, switching between the normal image capture and the macro image capture modes is performed by advance and retreat movement of the feeding ring by means of screwing of a multiple-thread male screw of a feeding ring and a multiple-thread female screw of the holder, by rotating the feeding ring integrally with the operation knob. Focus adjustment of the image capture lens incorporated into the lens barrel is performed using the focus adjustment female screw of the feeding ring and the focus adjustment male screw of the lens barrel.

As another example, a compact and inexpensive lens adjustment device with a simple configuration has been disclosed, comprising a lens adjustment mechanism which performs image capture lens focus adjustment and image capture mode switching (see Patent Document 2). This lens adjustment device has cam portions at the fixed lens barrel and at the lens frame, and comprises an adjustment ring having at one end a cam portion joined with the cam portion of the lens frame, and having at the other end a cam portion joined with the cam portion of the fixed lens barrel; a function is comprised such that, by rotating an adjustment lever, the lens frame moves forward and backward along the optical axis, and switching between normal image capture mode and macro image capture mode is possible.

Further, a focusing adjustment mechanism, which enables focusing adjustment during assembly without causing lens optical axis shifts, has been disclosed (see Patent Document 3) as an example of formation of a lens feeding mechanism which utilizes a cam mechanism similar to that of the above-described lens adjustment device. By means of this focusing adjustment mechanism, a focusing adjustment function is effected by rotating the feeding member at the time of focusing adjustment to adjust the position of the member. Hence even when the feeding member is rotated for focusing adjustment, the lens moves along the optical axis according to the rotation amount, so that optical axis shifts due to eccentricity and similar do not occur.

Patent Document 1: Japanese Unexamined Patent Application Publication No. 2003-337279

Patent Document 2: Japanese Unexamined Patent Application Publication No. 10-170809

Patent Document 3: Japanese Unexamined Utility-Model Application Publication No. 03-33421

DISCLOSURE OF THE INVENTION

Problems to be Solved by the Invention

However, multiple-thread screws are used in the above-described macro image capture lens feeding devices, and when using such methods it is necessary to secure adequate thickness in the direction parallel to the direction of screw advance of the multiple-thread screw portion (hereafter called the "screw length"), so that it is difficult to reduce the thickness of the device in this direction. This is because if adequate screw length for the multiple-thread screw is not secured, it is difficult to form the die while maintaining the required mechanical precision. In addition, in cases where a female screw formed by a die is mated with (hereafter also "screwed together with") a male screw, if the screw length is short, it is difficult to reduce the rattle occurring in the screwed portion.

For example, in the case of an image capture lens incorporated into a portable telephone or similar, when movement of approximately 0.16 mm with a rotation of approximately 20° is necessary, if the screw method is to be used, a screw lead angle of 7° is required; if a four-thread screw design is used, the interval between screw threads (pitch) must be set to 0.72 mm. In this case, as the screw length, approximately 2.88 mm (=0.72 mm×4), which is the movement amount obtained by rotation through 360°, is necessary for ease of part machining and for screw stability. Thus in order to configure a feeding mechanism using a screw method, the need arises to secure a screw length of at least a fixed length. Hence the device cannot be made thin in the direction parallel to the direction of screw advance, and as a result, device compactness is difficult to achieve.

In the above-described lens adjustment device, the adjustment wring is mated with a mating part in order to move the lens frame forward or backward along the optical axis by rotating the lens frame, and moreover a pressure is applied by a coil spring such that the lens frame moves in both directions proportionally to the amount of rotation.

Because the coil spring is mounted directly on the lens frame, the contact portion between coil spring and lens frame is in a line contact or point contact state. The contact portion between the coil spring and lens frame is a portion at which the coil spring and the lens frame rub together due to rotation of the lens frame, and consequently there is the problem that extended use tends to cause wear to this contact portion. That is, this wear gives rise to either damage to the lens frame, or a defect in back-and-forth motion operation by rotation of the lens frame, impeding stable focus adjustment and macro control. Further, the rubbing together of the coil spring and lens frame may cause separation of pieces of these constituent members, which may fall onto the imaging area and become the cause of noise in images.

The lens frame is fitted into a fixed cylinder, configured such that the lens frame moves along the fixed cylinder. This configuration secures stability of the optical axis only in the cylinder portion in which the lens frame and fixed lens barrel are mated. However, if an adequate length is to be secured for the portion in which the lens frame and fixed cylinder are mated, it becomes difficult to move the lens frame without causing changes to the optical axis of the image capture lens. That is, the shorter the length over which the lens frame is fitted into the fixed cylinder, the greater is the extent of wobble of the lens frame, arising from the gap between the lens frame and the fixed cylinder; and when the lens frame is moved, the shift in optical axis of the image capture lens installed in the lens frame is increased.

This lens adjustment device impacts the thickness of the device by adding the thickness of the lens frame and adjustment ring, in addition to the length of the portion in which the lens frame is fitted into the fixed cylinder. Hence if an adequate length is secured for the portion in which the lens frame and fixed cylinder are mated, then as a result the overall thickness of the device cannot be reduced, and it is not possible to obtain a thin device.

In the above-described focusing adjustment mechanisms, the heights of the plurality of cams installed in the feeding member must be made precisely equal. If there is scattering in the plurality of cam heights, there is the problem of tilting of the lens optical axis from the intended position. Moreover, a spring clamp or other member must be used to apply constant pressure, using a leaf spring, to the feeding member or similar on the side of the camera main unit on which the image capture plane is positioned; and this leaf spring and spring clamp are configured for point or line contact. Hence the portions in contact with the spring clamp and leaf spring are portions which rub together upon rotation of the lens barrel, and consequently the contact portions tend to wear with extended use. Hence similarly to the above-described macro image capture lens feeding devices, this wear may give rise to a defect in back-and-forth motion operation by rotation of the lens barrel, impeding stable focus adjustment and macro control, and possibly causing noise in images.

This invention was devised in light of the above circumstances, and has as an object the provision of an image capture lens feeding device which enables switching between a normal image capture mode and a macro image capture mode, which is thin, and in which wear of constituent members does not readily occur even after repetition of operations to switch between normal image capture mode and macro image capture mode.

Here, the thickness of an image capture lens feeding device refers to the length along the image capture lens optical axis direction from the light incidence end to the light emission end, and "thin" means that this length is short. In order to obtain a thin image capture lens feeding device, in addition to employing a design which shortens the optical length of the image capture lens, it is also necessary to make thin the feeding mechanism portion which supports the image capture lens. That is, this invention has as an object the provision of an image capture lens feeding device in which the feeding mechanism portion has been made thin.

Means for Solving the Problems

In order to attain the above-described objects, according to the gist of the invention, an image capture lens feeding device with the following configuration is provided. That is, an image capture lens feeding device of this invention comprises a lens retention housing, holder, cam mechanism, pressing cover, spacer, and spring mechanism.

The lens retention housing comprises a lens group constituting the image capture lens, such that the optical axis of the lens group is made to coincide with the rotation axis, and enables back-and-forth motion along this rotation axis of the lens group while being rotated. The holder is slidably coupled with the lens retention housing and holds the lens retention housing, and comprises in the center portion a window through which transmitted light passes. The cam mechanism is configured having first cam means, provided in the lens retention housing, and second cam means, provided on the holder, and which slips relative to the first cam means. The pressing cover is formed so as to enable coupling with the holder; through coupling of the pressing cover and holder, the image capture lens feeding device of this invention is integrated.

The spacer rotates about the rotation axis integrally with the lens retention housing, is in plane contact with the pressing cover, and is coupled with the lens retention housing without impeding back-and-forth motion of the lens retention housing. The spring means is inserted between the lens retention housing and spacer, and acts in pressing contact with the first cam means and second cam means.

By rotating the lens retention housing with respect to the holder, the lens retention housing can be moved back and forth with respect to the holder, and by this means the image capture lens incorporated into the lens retention housing can be fed out.

More specifically, the cam mechanism can be configured as follows. The first and second cam means can be configured as a cam face and cam protrusion respectively, or conversely, the first and second cam means can be configured as a cam protrusion and cam face respectively.

For convenience in the process of assembly of an image capture lens feeding device of this invention, it is suitable that the lens retention housing be configured comprising a lens barrel and feeding ring. The lens barrel incorporates the image capture lens, and a single-thread screw is formed on the outer periphery. On the inner periphery of the feeding ring is formed a single-thread female screw, which screws together with the single-thread male screw formed on the outer periphery of the lens barrel.

The spring means inserted between the lens retention housing and spacer can be realized through the following first through third spring means. The first spring means comprises at least two micro-coil springs positioned at a distance from each other, fixed at one end of either the feeding ring or the spacer, configured such that the micro-coil springs press against the spacer. The second spring means comprises a ring-shape wave spring of size sufficient to encompass the outer periphery of the lens barrel; this ring-shape wave spring is enclosed between the spring means contact face of the feeding ring and the holder-side face of the spacer. The third spring means comprises a macro-coil spring of size sufficient to encompass the outer periphery of the lens barrel; this macro-coil spring is enclosed between the spring means pressure-contact face of the feeding ring and the holder-side face of the spacer.

It is suitable that the feeling ring be configured comprising an operation knob. It is also suitable that a groove be formed in the lens barrel, so as to enable mounting of a tool to cause rotation of the lens barrel relative to the feeding ring.

In addition, it is suitable that an optical axis retention mechanism be comprised, in which sliding coupling portions are provided between the pressing cover and the lens retention housing, and between the holder and the lens retention housing, so that the lens retention housing can undergo back-and-forth motion along the optical axis, while retaining the optical axis.

A method of assembly of an image capture lens feeding device of this invention comprises the following first through fourth steps.

The first step is a step of screwing together the lens barrel and the feeding ring, and of forming an unfixed lens retention housing in a state in which the lens barrel can be rotated relative to the feeding ring. The second step is a step of causing the unfixed lens retention housing to slidably couple with the holder, and provisionally fixing at either the most distant position, or at the closest position, relative to the image plane of the image capture lens. The third step is a step of focusing adjustment such that the image of the image capture lens is focused in the image plane, by rotating the lens barrel relative to the feeding ring. The fourth step is a step, in the state in which focusing adjustment has been completed, of bonding and fixing the lens barrel and feeding ring, and forming the lens retention housing.

EFFECTS OF THE INVENTION

By means of an image capture lens feeding device of this invention, a lens retention housing incorporating an image capture lens is configured, slidably coupled with the holder and held, with the image capture lens optical axis coincident with the rotation axis, to enable back-and-forth motion relative to the holder along the rotation axis while being rotated. The holder comprises in the center portion a window which passes light transmitted by the image capture lens, and is fixed to the portable telephone or other image capture device main unit, comprising an imaging area.

The holder is fixed to the image capture device main unit so as to cause incidence of the light transmitted by the image capture lens onto the imaging area with greatest efficiency, that is, so that the optical axis of the image capture lens intersects the imaging area at the center position. Hence by sliding the lens retention housing on the holder, in back-and-forth motion parallel to the optical axis, the interval between the imaging area and the position of a principal point of the image capture lens can be changed, and so the principal point position of the image capture lens relative to the imaging area can be adjusted such that the image of the image capture lens is accurately formed in the imaging area. That is, by adjusting the interval between the imaging area and the image capture lens principal point position, the normal image capture mode or macro image capture mode can be selected, and can both be set.

The above-described back-and-forth motion of the lens retention housing relative to the holder is realized by the cam means. That is, a configuration is employed in which back-and-forth motion is realized by cam means, so that compared with a case of realization using a multiple-thread screw, the thickness of the lens retention housing in the direction parallel to the optical axis direction (hereafter also called the "thickness of the lens retention housing") can be made thin.

A further characteristic of an image capture lens feeding device of this invention is the comprising of a spacer. This spacer rotates about the rotation axis integrally with the lens retention housing, is in plane contact with the pressing cover, and is coupled with the lens retention housing without impeding the back-and-forth motion of the lens retention housing. Hence when moving the lens retention housing in rotation relative to the holder, the place which is in contact so as to slide is in plane contact, as explained below.

The place which is in sliding contact when the lens retention housing is moved in rotation is, specifically, the contact face between spacer and pressing cover. That is, the spring means and spacer are in point contact or line contact, but because this contact portion is configured to rotate about the rotation axis integrally with the lens retention housing, there is no sliding. That is, the micro-coil springs, ring-shape wave spring, and macro-coil spring comprised by the spring means are all inserted between the lens retention housing and the spacer, and moreover rotate integrally with the lens retention housing and spacer about the rotation axis, so that the lens retention housing, the spring means, and the spacer rotate integrally.

As a result, even when the operation of switching between normal image capture mode and macro image capture mode by back-and-forth motion of the lens retention housing relative to the holder is repeated, wear of the constituent members does not readily occur.

Further, by means of the spring means, the first cam means and second cam means are kept in pressing contact, so that back-and-forth motion of the lens retention housing relative to the holder is guaranteed. That is, by means of the spring means, if the first cam means and second cam means are not held in pressing contact, the slight friction of the sliding portion of the holder and the lens retention housing may hinder back-and-forth motion.

By configuring the lens retention housing to comprise a lens barrel on the outer periphery of which is formed a single-thread male screw and a feeding ring on the inner periphery of which is formed a single-thread female screw, the following advantages are obtained. That is, when assembling the image capture lens feeding device, first, in a state in which the lens retention housing is set in the position of either the normal image capture mode or in the macro image capture mode, focusing adjustment must be performed such that the real image is formed in the imaging area. This focusing adjustment task can easily be performed by rotating the lens barrel relative to the feeding ring.

Also, if a groove is formed in the lens barrel so as to enable mounting of a tool in order to rotate the lens barrel relative to the feeding ring, the following advantage is obtained. That is, in order to form the lens retention housing with a small thickness, it is preferable that the length of the lens barrel be set such that the lens barrel fits completely within the range in which a female screw is formed on the feeding ring. If this groove is not formed, because the lens barrel is inserted completely into the inside of the feeding ring, it is difficult to mount a tool in order to rotate the lens barrel relative to the feeding ring.

However, because the male screw and female screw formed for the purpose of lens barrel feeding operation are single-thread screws, rattling between the lens barrel and the feeding ring can be suppressed adequately, even if the screw portion of the male screw and female screw is not made long, and the above-described focusing adjustment task can be performed easily and securely. As a result, the thickness of the lens retention housing can be reduced.

The screw formed for feeding operation of the lens barrel is a single-thread screw, and so the rotation amount required for the lens barrel feeding amount is greater than for a multiple-thread screw. However, rotation of the lens barrel relative to the feeding ring to perform focusing adjustment is performed only at the time of manufacture of the image capture lens feeding device. Hence even if the rotation amount necessary for the lens barrel feeding amount is large, this is not a problem for practical purposes.

Further, by forming a groove on the lens barrel, the method of assembly of an image capture lens feeding device of this invention, comprising the above-described first through fourth steps, can be implemented. That is, in the third step, at the time at which the task of rotating the lens barrel relative to the feeding ring is performed, a state obtains in which the lens barrel is inserted substantially completely into the feeding ring. If such a design is not employed, the thickness of the lens retention housing cannot be made sufficiently thin.

The thickness of the lens retention housing is the sum of the thickness of the feeding ring in the direction parallel to the optical axis direction, and the length of the lens barrel portion protruding from the feeding ring; hence the thickness can be made smallest in the state in which substantially the entire lens barrel is inserted into the feeding ring, that is, by reducing the length of the lens barrel portion protruding outside of the feeding ring to zero.

When the image capture lens feeding device is mounted on optical equipment, and the optical equipment is used in the normal state, if the feeding ring comprises an operation knob, this knob can be used to rotate the lens retention housing to easily switch between the normal image capture mode and the macro image capture mode. That is, the lens retention housing is a constituent member formed by integrating the lens barrel and the feeding ring, so that by using the operation knob formed on the feeding ring, the lens retention housing can be rotated.

An optical axis retention mechanism is comprised in which sliding coupling portions are provided in a plurality of locations, so that even when the dimensions along the optical axis direction are made short at each sliding coupling portion location, the lens retention housing can undergo back-and-forth motion along the optical axis direction while maintaining the optical axis with sufficient precision.

Figure 1:
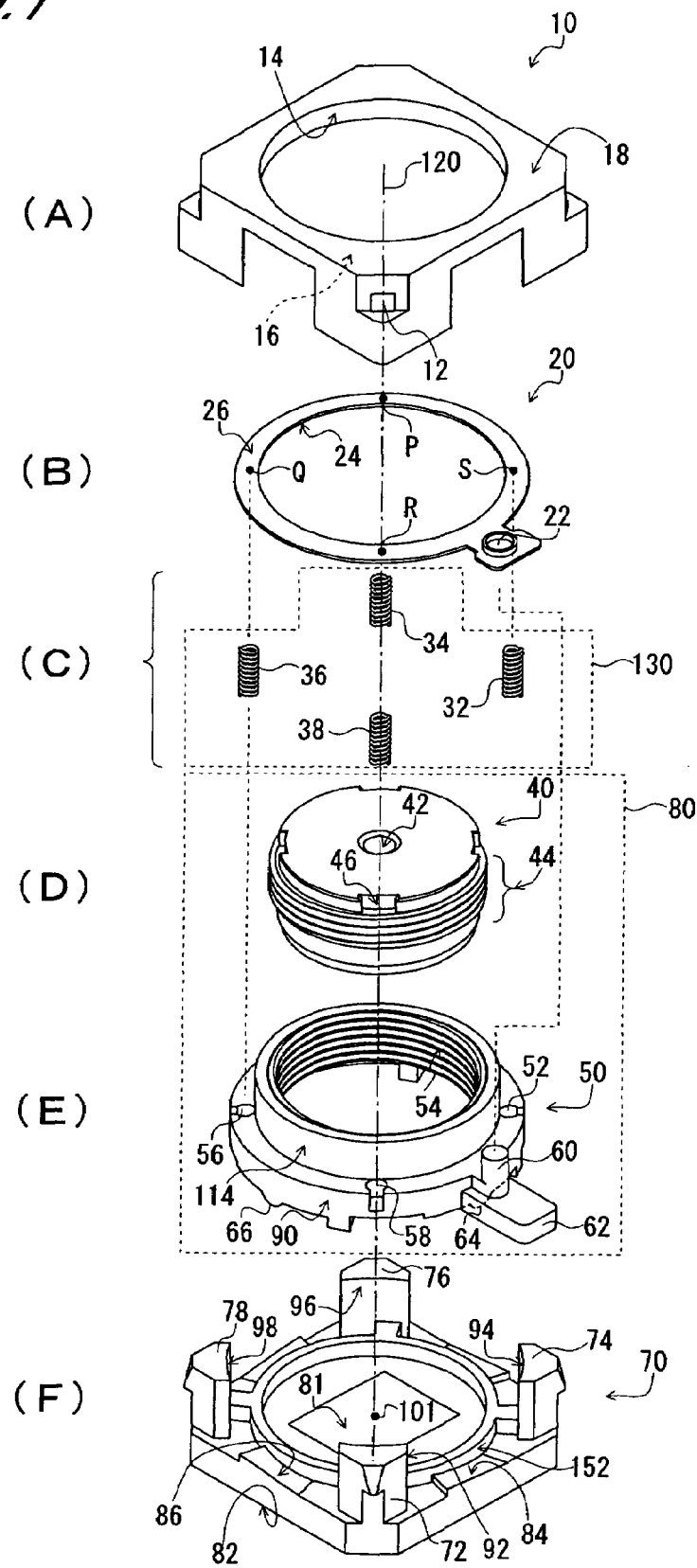
FIG. 1 is a summary exploded oblique view of the image capture lens feeding device of a first embodiment.

EXPLANATIONS OF LETTERS OR NUMERALS 10, 100: pressing cover
12, 102: pressing cover-side claw portions
20: spacer
22: linking hole
32, 34, 36, 38: micro-coil spring
40: lens barrel
42: incident-light opening portion
44: single-thread male screw
46: groove
50, 250: feeding ring
52, 56, 58: micro-coil spring mating hole
54: single-thread female screw
60: linking rod
62: operation knob
63: spring means pressing face
64, 66: cam protrusion
70: holder
72, 74, 76, 78: holder-side claw portion
80: lens retention housing
81: window
84, 86: cam face
130: set of micro-coil springs
230: ring-shape wave spring
330: macro-coil spring

BEST MODE FOR CARRYING OUT THE INVENTION

Below, aspects of the invention are explained, referring to the drawings. These drawings merely show in summary the shapes, sizes, and arrangement of constituent elements to an extent enabling an understanding of the invention; moreover, the numerical conditions and other conditions in the following explanations are merely preferred examples, and the invention is not limited to these aspects of the invention. Further, similar constituent elements in the drawings are assigned the same numbers, and redundant explanations may be omitted.

First Embodiment

Figure 8:
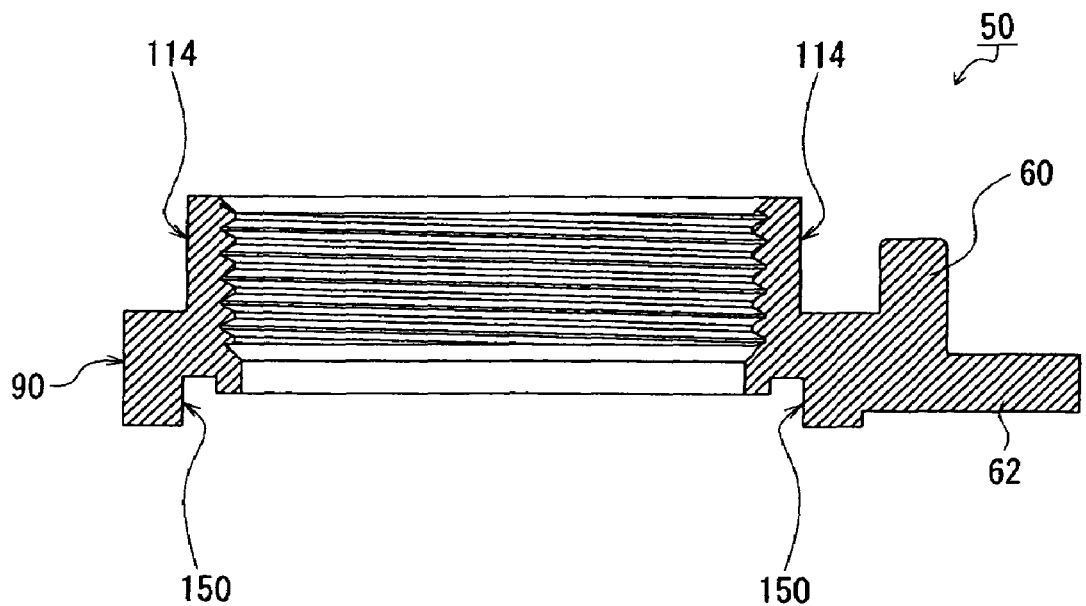

The configuration and operation of the image capture lens feeding device of a first embodiment are explained, referring to (A) through (F) in FIG. 1 and to FIG. 8. (A) through (F) in FIG. 1 are a summary exploded oblique view of the image capture lens feeding device of the first embodiment; (A) shows a pressing cover 10, (B) shows a spacer 20, (C) shows a set of micro-coil springs 130, (D) shows a lens barrel 40, (E) shows a feeding ring 50, and (F) shows a holder 70. FIG. 8 is a cutaway cross-sectional view resulting from cutting in the direction parallel to the optical axis direction of the feeding ring 50.

The lens retention housing 80 comprises the lens barrel 40 and feeding ring 50. The lens barrel 40 incorporates an image capture lens (not shown), and on the outer periphery is formed a single-thread male screw 44. On the inner periphery of the feeding ring 50 is formed a single-thread female screw 54 which screws together with the single-thread male screw 44 formed on the outer periphery of the lens barrel 40.

The lens retention housing 80 comprises a lens group (not shown) comprising the image capture lens, such that the optical axis of the lens group is made to coincide with the rotation axis, and enables back-and-forth motion along this rotation axis of the lens group, relative to the holder 70, while being rotated. By screwing the single-thread male screw 44 of the lens barrel 40 into the single-thread female screw 54 of the feeding ring 50, to rotate the lens barrel 40 relative to the feeding ring 50, back-and-forth motion relative to the feeding ring 50 is possible.

In (A) through (F) of FIG. 1, the lens group optical axis and the rotation axis are represented by a dot-dash line 120 which passes through (A) through (F) in FIG. 1 in common. The lens group optical axis and the rotation axis are made coincident, and so hereafter "optical axis 120" or "rotation axis 120" may be used as convenient, but both refer to the same axis.

The holder 70 engages in sliding coupling with the lens retention housing 80 and holds the lens retention housing 80, and comprises in the center portion a window 81 which passes light transmitted by the image capture lens.

An optical axis retention mechanism comprising the image capture lens feeding device of the first embodiment is explained, as a means of maintaining the optical axis 120 while the lens retention housing 80 undergoes back-and-forth motion along this rotation axis 120.

The optical axis retention mechanism comprises the sliding coupling portion between the pressing cover 10 and lens retention housing 80, and the sliding coupling portion between the holder 70 and lens retention housing 80. The sliding coupling portion between the pressing cover 10 and lens retention housing 80 is configured by bringing into smooth contact the cylinder inner face 14 of the pressing cover 10 and a second outer-periphery face 114 (shown in FIG. 8) of the feeding ring 50 comprised by the lens retention housing 80. The sliding coupling portion between the holder 70 and lens retention housing 80 is configured by sliding coupling portions provided in two places. The sliding coupling portion in one place is configured by bringing into smooth contact the inner-periphery face 150 of the feeding ring 50 shown in FIG. 8 and the circular column outer-periphery face 152 of the holder 70.

The sliding coupling portions in two places at which there is sliding coupling between the holder 70 and lens retention housing 80 are explained. The sliding coupling portions in two places are configured such that there is smooth contact of a first outer-periphery face 90 of the feeding ring 50 comprised by the lens retention housing 80 with the inner faces 92, 94, 96 and 98 of the holder-side claw portions 72, 74, 76, 78 respectively comprised by the holder 70.

The inner faces 92, 94, 96, 98 of the holder-side claw portions 72, 74, 76, 78 respectively form a portion of the side face of the same circular column. That is, the first outer-periphery face 90 of the feeding ring 50 is equivalent to a piston, and the inner faces 92, 94, 96, 98 of the holder-side claw portions 72, 74, 76, 78 comprised by the holder 70 are equivalent to a cylinder which mates with the piston. By means of a configuration in which the center axis of the piston and cylinder coincides with the center axis of the image capture lens or with the rotation axis 120, the optical axis of the image capture lens can be made coincident with the rotation axis 120, and the lens retention housing 80 can be moved in back-and-forth motion relative to the holder 70 along the rotation axis 120 while being rotated, while maintaining sliding coupling with the holder 70. That is, by using the cam mechanism described below, the lens retention housing 80 can undergo back-and-forth motion relative to the holder 70 along the rotation axis (lens optical axis) while being rotated, accompanying a rotating operation.

As explained above, the optical axis retention mechanism is configured by providing sliding coupling portions in a plurality of places. That is, in the first embodiment a configuration is employed comprising a sliding coupling portion provided between the pressing cover 10 and the lens retention housing 80, and sliding coupling portions provided at two places between the holder 70 and lens retention housing 80, for sliding coupling portions in a total of three places. By thus providing sliding coupling portions in a plurality of places as an optical axis retention mechanism, even when the dimension in the optical axis direction of the sliding coupling portion in one place is short, the lens retention housing can undergo back-and-forth motion along the optical axis direction while maintaining the optical axis 120 with adequate precision. That is, by providing sliding coupling portions at a plurality of places distant from each other, even though the dimension along the optical axis direction of the sliding coupling portion in one place is short, adequately long dimensions are secured along the optical axis direction for the entire optical axis retention mechanism. As a result, the total length from the upper face 18 of the pressing cover 10 to the lower face 82 of the holder 70, that is, the thickness of the feeding mechanism portion, can be made thin.

Next, the cam mechanism is explained, referring to (E) and (F) in FIG. 1. In this image capture lens feeding device, as shown in (E) of FIG. 1, cam protrusions are formed as first cam means on the feeding ring 50 of the lens retention housing 80. In (E) of FIG. 1, cam protrusions 64 and 66 are shown at only two places, but cam protrusions are formed in a total of four places. The cam protrusions other than the cam protrusions 64 and 66 are not shown.

As shown in (F) of FIG. 1, cam faces are formed on the holder 70 as second cam means. In (F) of FIG. 1, only the cam faces 84 and 86 in two places are shown clearly; but cam faces are formed in a total of four places, so as to correspond to the above-described cam protrusions formed in four places.

Further, in the first embodiment, the cam mechanism was configured as four sets of first and second cam means; but it is sufficient that there be at least three sets of first and second cam means. That is, if there are three sets of first and second cam means, then the contact points between the cam protrusions and cam faces in the three sets of cam means determine a single plane. By forming an arrangement of sets of first and second cam means such that this plane perpendicularly intersects the rotation axis 120, the lens retention housing 80 can be made to move in back-and-forth motion relative to the holder 70 along the image capture lens optical axis (rotation axis) while being rotated.

In the first embodiment, the first cam means are cam protrusions and the second cam means are cam faces; but the opposite arrangement may be employed. That is, cam faces may be positioned on the feeding ring 50, and cam protrusions positioned on the holder 70.

On the pressing cover 10 are formed pressing cover-side claw portions 12 for coupling with the holder 70. In the oblique view of the pressing cover 10 shown in (A) of FIG. 1, the pressing cover-side claw portions provided in three places in addition to the pressing cover-side claw portion 12 shown are in positions hidden on the rear side in the drawing, and so are not shown.

On the holder 70 are formed holder-side claw portions 72, 74, 76, 78 for coupling with the above-described pressing cover 10. The pressing cover 10 and holder 70 are coupled by fitting the outward-directed tee-h of the holder-side claw portions 72, 74, 76, 78 into the rectangular holes provided in the pressing cover-side claw portions of the pressing cover 10. For example, the holder-side claw portion 72 mates with the pressing cover-side claw portion 12. The holder-side claw portions 74, 76, 78 also are coupled with the respective corresponding pressing cover-side claw portions.

Between the pressing cover 10 and holder 70 are enclosed a spacer 20, a micro-coil spring set 130, and the lens retention housing 80; as explained above, by coupling the pressing cover 10 and holder 70 by means of the respective claw portions, an integrated image capture lens feeding device is assembled.

On the spacer 20 is formed a protruding portion in a portion of the ring, as shown in (B) of FIG. 1, and a linking hole 22 is formed in the protruding portion. On the other hand, a linking rod 60 is formed, fixed to the outer periphery 90, on the feeding ring 50 as shown in (E) of FIG. 1. The linking rod 60 is inserted smoothly into the linking hole 22. By means of this configuration, the feeding ring 50 of the lens retention housing 80 and the spacer 20 are integrated via the linking rod 60.

By integrating the feeding ring 50 of the lens retention housing 80 and the spacer 20 via the linking rod 60, as the lens retention housing 80 rotates about the rotation axis 120, the spacer 20 also rotates integrally about the rotation axis 120.

Except for the protruding portion formed in one portion to form the linking hole 22, the spacer 20 is accommodated on the inside of the pressing cover 10. At this time, the upper face 26 of the spacer 20 and the lower face 16 of the pressing cover 10 are in plane contact. Further, by smoothly inserting the linking rod 60 into the linking hole 22, the spacer 20 and lens retention housing 80 can be coupled in a state in which back-and-forth motion of the lens retention housing 80 is not impeded.

The micro-coil spring set 130 is inserted between the lens retention housing 80 and spacer 20, and acts in pressing contact with the above-described cam protrusions 64, 66 and similar which are the first cam means, and the cam faces 84, 86 and similar which are the second cam means. The spring means of the first embodiment may also be called first spring means, to distinguish from the spring means used in the second and third embodiments described below. In addition, the spring means used in the second embodiment and in the third embodiment may be called the second spring means and the third spring means respectively.

The first spring means comprises a set of at least two micro-coil springs. The spring means shown in (C) of FIG. 1 is an example comprising a set of four micro-coil springs, 32, 34, 36, 38; but if at least two micro-coil springs are comprised, the first spring means can be configured. That is, in the state in which the upper face 26 of the spacer 20 and the lower face 16 of the pressing cover 10 are in plane contact, the lens retention housing 80 is rotated.

Micro-coil spring mating holes 52, 56, 58 for mating in order to fix in place the above-described four micro-coil springs 32, 34, 36, 38 are formed in the feeding ring 50. The micro-coil spring mating hole into which the micro-coil spring 34 is mated is positioned hidden on the rear side in the drawing (E) of FIG. 1, and so is not shown. With one end of each of the micro-coil springs 32, 34, 36, 38 mated with the micro-coil spring mating holes, the other ends of each are in contact with positions on the spacer 20 indicated by S, P, Q, and R. In (B) of FIG. 1, the upper face (the face on the side of the pressing cover 10) of the spacer 20 is seen due to the circumstances of the drawing; but the spacer 20 and micro-coil springs are in contact at the lower face (the face on the side of the holder 70) of the spacer 20.

These micro-coil springs 32, 34, 36, 38 and the spacer 20 are in point contact at the positions S, P, Q and R respectively; but the spacer 20 and the lens retention housing 80 are integrated by means of the linking hole 22 and linking rod 60, so that when the lens retention housing 80 is rotated, the spacer 20 also rotates simultaneously by an equal amount according to this rotation. Hence the positions indicated by S, P, Q, R at which there is point contact between the micro-coil springs and the spacer 20 are not changed even when the lens retention housing 80 is rotated. Consequently wear of the spacer 20 does not occur at the portions in which the micro-coil springs and the spacer 20 are in point contact.

In the first embodiment, a feeding ring 50 is used in which micro-coil spring mating holes 52, 56, 58 are mated with the above-described four micro-coil springs 32, 34, 36, 38, respectively; but this is merely one example. The micro-coil springs comprised by the first spring means may be fixed to either one among the feeding ring 50 or the spacer 20, and may be fixed in place by welding or similar. Further, in consideration of the processes to manufacture the image capture lens feeding device, it is desirable that the micro-coil springs be fixed to either one among the feeding ring 50 or the spacer 20; but in principle, the micro-coil springs may be either fixed or not fixed to both the feeding ring 50 and to the spacer 20.

When the lens retention housing 80 is rotated relative to the holder 70, the cam protrusions 64, 66 formed on the feeding ring 50 comprised by the lens retention housing 80 slide on the cam faces 84, 86 formed on the holder 70. By this means, the lens retention housing 80 can be made to undergo back-and-forth motion relative to the holder 70 along the optical axis 120 of the image capture lens, and the image capture lens incorporated into the lens retention housing 80 can be fed out.

The feeding ring 50 comprises, at one place on the first outer-periphery face 90 of the feeding ring 50, an operation knob 62, directed outwards. In the lens barrel 40 is formed a groove or similar 46, so as to enable mounting of a tool to cause rotation of the lens barrel 40 relative to the feeding ring 50. In (D) of FIG. 1, grooves are formed in four places, but only the groove 46 is shown clearly. The number of grooves is determined appropriately according to the circumstances of the tool used to rotate the lens barrel 40 relative to the feeding ring 50. Further, an incident-light opening portion 42 is formed to enable light to be incident on the image capture lens.

Figure 2:
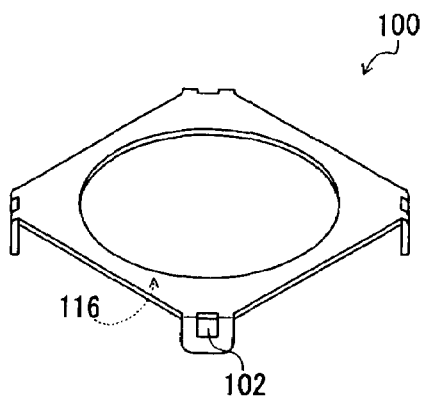
FIG. 2 is a summary oblique view of a pressing cover with another shape.

The pressing cover 10 can also be formed in another shape, shown in FIG. 2. FIG. 2 is a summary oblique view of a pressing cover in another shape. The pressing cover 10 shown in (A) of FIG. 1 is suitable for formation using an ABS resin or another plastic material; a pressing cover 100 in the different shape shown in FIG. 2 is suitable for formation using a metal material.

The pressing cover-side claw portions 102 of the pressing cover 100 shown in FIG. 2 correspond to the pressing cover-side claw portions 12 of the pressing cover 10 shown in (A) of FIG. 1. The pressing cover-side claw portions 102 are formed in the four corners of the pressing cover, for a total of four places, and correspond to the pressing cover-side claw portions formed in the four corners of the pressing cover 10. The lower face 16a of the pressing cover 10 corresponds to the lower face 116 of the pressing cover 100.

Figure 3:
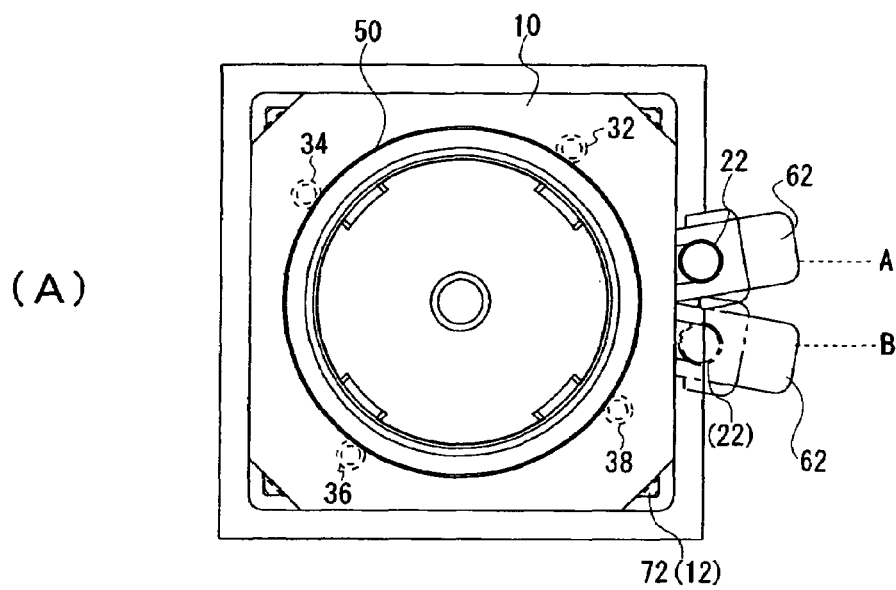
FIG. 3 is a plane view and partial cutaway cross-sectional view of the image capture lens feeding device of the first embodiment.
Figure 3:
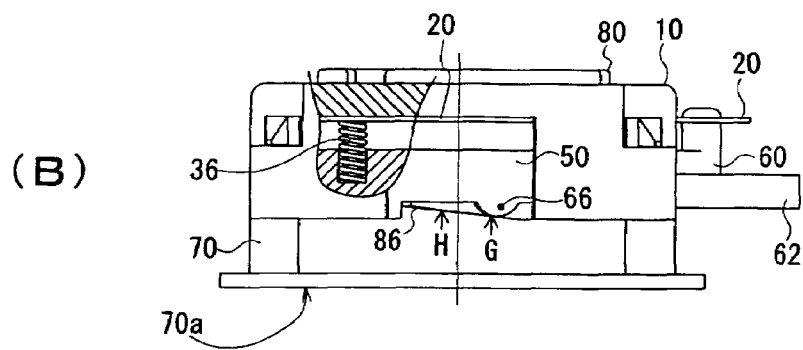

The configuration of the assembled state of the image capture lens feeding device of the first embodiment is explained, referring to (A) and (B) in FIG. 3. (A) in FIG. 3 is a plane view of the image capture lens feeding device of the first embodiment, seen from the image input side; (B) of FIG. 3 is a partial cutaway cross-sectional view seen from a direction perpendicular to the optical axis. In (A) of FIG. 3, the positions of the micro-coil springs 32, 34, 36, 38, comprised by the micro-coil spring set 130, are indicated by dashed-line circles.

As shown in (A) of FIG. 3, the lens retention housing 80 can be made to rotate by rotational operation of the operation knob 62. The linking hole 22 formed in the spacer 20 also moves simultaneously to track the rotational movement of the operation knob 62.

In (A) of FIG. 3, a case is shown in which the operation knob 62 is set to the normal image capture mode and to the macro image capture mode. By changing the setting position of the operation knob 62 as shown in (A) of FIG. 3, the lens retention housing 80 is caused to move rotationally. As shown in (B) of FIG. 3, when the operation knob 62 is at the normal image capture mode position (A), the cam protrusion 66 and cam face 86 are in contact at the position of point G. When the operation knob 62 is moved from this state to macro image capture mode position (B), the contact position between the cam protrusion 66 and cam face 86 moves while sliding from the position of point G to the position of point H. At this time the cam protrusion 66 is in a state of having slid upward on the cam face 86, and this is accompanied by movement of the lens retention housing 80 toward the upper side of (B) in FIG. 3.

That is, a principal position of the image capture lens incorporated into the lens retention housing 80 moves toward the upper side of (B) in FIG. 3.

When on the other hand the operation knob 62 is moved from the macro image capture mode position to the normal image capture mode position, the contact position of the cam protrusion 66 and cam face 86 moves while sliding from the position of point H to the position of point G. At this time, the cam protrusion 66 is in a state to slide down the cam face 86. In order to reliably ensure this sliding falling operation, a configuration is employed in which the cam protrusion 66 is in pressing contact with the cam face 86 by means of the first spring means. In (B) of FIG. 3, one micro-coil spring 36 among the micro-coil springs comprised by the first spring means is shown.

In (B) of FIG. 3, the imaging area is not shown, but the imaging area is provided directly below the bottom face 70a of the holder 70. That is, when the operation knob 62 is moved from the normal image capture mode position to the macro image capture mode position, the principal point position of the image capture lens incorporated into the lens retention housing 80 moves toward the upper side in (B) of FIG. 3, and so moves away from the imaging area. Conversely, when the operation knob 62 is moved from the macro image capture mode position to the normal image capture mode position, the principal point position of the image capture lens approaches the imaging area. In this way, by manipulating the position of the operation knob 62, switching between the normal image capture mode and the macro image capture mode can be performed.

Method of Assembly of Image Capture Lens Feeding Device

In order to assemble an image capture lens feeding device of this invention, the following operations may for example be performed. Upon assembly, an important step is the step of integrating the lens barrel 40 and feeding ring 50 to form the lens retention housing 80. This step is closely related to the focusing adjustment task which is performed only at the time of assembly of the image capture lens feeding device. When assembling the image capture lens feeding device, first, in a state in which the lens retention housing 80 is set to the normal image capture mode or the macro image capture mode position, focusing adjustment must be performed such that a real image is formed in the imaging area (not shown).

In the image capture lens feeding device assembly method, the following first through fourth steps are executed. Here, an example is explained of a case in which the image capture lens feeding device of the first embodiment is assembled, but the cases in which the image capture lens feeding devices of the second and third embodiments are assembled are similar. Differences between the image capture lens feeding devices of the first through third embodiments are in the spring means; in the method of assembly of an image capture lens feeding device explained below, the method is entirely the same even when these spring means are different.

In the first step, the lens barrel 40 and feeding ring 50 are screwed together, to form an unfixed lens retention housing in a state in which the lens barrel 40 can be rotated relative to the feeding ring 50. The unfixed lens retention housing is in a state in which the lens barrel 40 and feeding ring 50 are screwed together, which is a state in which the lens barrel 40 can be freely rotated relative to the feeding ring 50. Rotation of the lens barrel 40 relative to the feeding ring 50 can be performed by mounting a rotation tool in a groove 46 in the lens barrel 40, formed in the lens barrel 40. Then, because the rotation tool can be utilized even when the lens barrel 40 is inserted completely into the single-thread female screw 54 of the feeding ring 50, the lens barrel 40 can be rotated relative to the feeding ring 50.

In the second step, the unfixed lens retention housing is placed into sliding coupling with the holder 70, and the position of the unfixed lens retention housing relative to the image plane of the image capture lens is provisionally fixed at either the position furthest away, or the closest position. When the second step is completed, there is no guarantee that an image will be formed in the imaging area by the image capture lens incorporated into the lens barrel 40.

In order to mount an image capture lens feeding device into the image capture device of a portable phone or similar, first the holder 70 is fixed onto the image capture device. In the case of an image capture lens feeding device of this invention, the holder 70 is bonded and fixed in place at a position such that the imaging area is directly below the window 81 of the holder 70. Then, the first and second steps are executed. Hence when the second step has ended, the distance from the principal point position of the image capture lens incorporated into the lens barrel 40 to the imaging plane comprised by the image capture device is not uniquely determined, but differs for each assembly task. Hence a focusing adjustment task must be performed, to adjust the distance from the image capture lens principal point position to the imaging area so as to form an image in the imaging area.

In the actual task of assembling the image capture lens feeding device, during this focusing adjustment task it is necessary that the distance adjustment amount from the principal point position of the image capture lens to the imaging area be estimated to be much greater than the movement amount of the lens retention housing 80 necessary when converting between normal image capture mode and macro image capture mode. Adjustment of the distance from the image capture lens principal point position to the imaging area is performed by rotating the lens barrel 40 relative to the feeding ring 50. The screw feeding the lens barrel 40 relative to the feeding ring 50 is a single-thread screw. Hence in addition to a large amount of motion of the lens barrel 40 relative to the feeding ring 50 during the focusing adjustment task, because a single-thread screw is used, the amount by which the lens barrel 40 is rotated is considerable.

However, operation to rotate the lens barrel 40 relative to the feeding ring 50 is only necessary during the assembly task. Hence in essence there is no problem posed by the large amount of rotation of the lens barrel 40 relative to the feeding ring 50 which is required. On the other hand, the amount of rotation of the lens retention housing 80 relative to the holder 70 which is necessary when converting between the normal image capture mode and the macro image capture mode cannot be made large. Hence in this invention, the operation to feed the lens retention housing 80 relative to the holder 70 is realized by means of a cam mechanism rather than a screw.

The third step is a step in which, by rotating the lens barrel 40 relative to the feeding ring 50, focusing adjustment is performed such that the image of the image capture lens is focused in the image plane. In the second step, the position of the unfixed lens retention housing relative to the image plane of the image capture lens is provisionally fixed at either the most distant position, or at the closest position.

If in the second step the position of the unfixed lens retention housing relative to the image plane of the image capture lens is provisionally fixed at the most distant position, then in the third step, when focusing adjustment is performed to focus the image of the image capture lens in the image plane, this position is finalized as the position of the macro image capture mode. And, if in the second step the position of the unfixed lens retention housing relative to the image plane of the image capture lens is provisionally fixed at the closest position, then in the third step, when focusing adjustment is performed to focus the image of the image capture lens in the image plane, this position is finalized as the position of the normal image capture mode.

In the fourth step, in the state in which the focusing adjustment task has been completed, the lens barrel 40 and feeding ring 50 are bonded and fixed, to form the lens retention housing 80.

Second Embodiment

Figure 4:
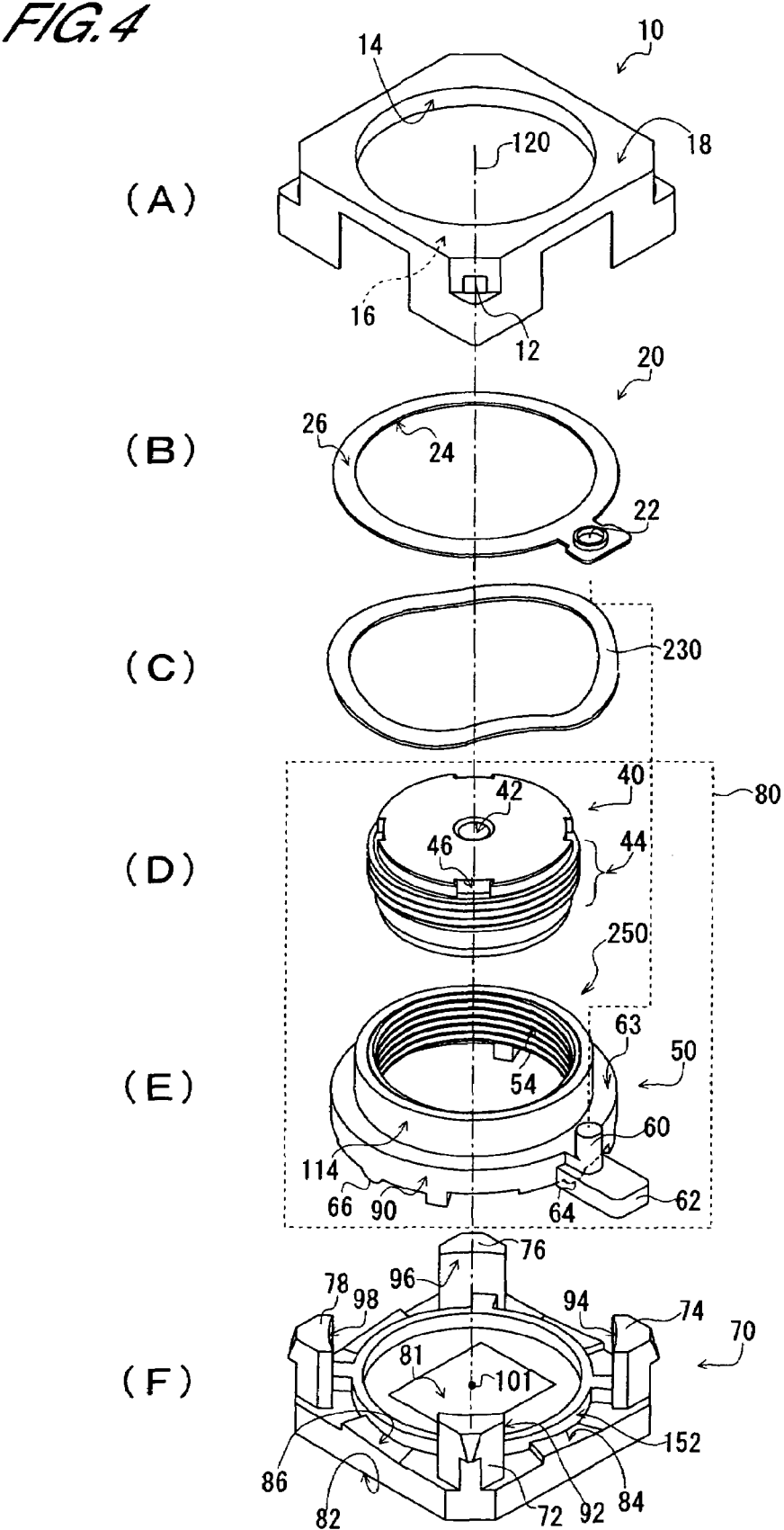
FIG. 4 is a summary exploded oblique view of the image capture lens feeding device of a second embodiment.

The configuration and operation of the image capture lens feeding device of a second embodiment are explained, referring to (A) through (F) in FIG. 4. (A) through (F) in FIG. 4 are a summary exploded oblique view of the image capture lens feeding device of the second embodiment; (A) shows a pressing cover 10, (B) shows a spacer 20, (C) shows a second spring means 230, (D) shows a lens barrel 40, (E) shows a feeding ring 250, and (F) shows a holder 70. A characteristic of the second embodiment is the use of a ring-shape wave spring 230, of size sufficient to surround the outer periphery of the lens barrel 40, as the second spring means. As a consequence, the feeding ring 250 shown in (E) of FIG. 4 has a shape different from that of the feeding ring 50 in the first embodiment. Hence differences with the first embodiment shown in (A) through (F) of FIG. 1 are the second spring means 230 shown in (C) of FIG. 4, and the feeding ring 250 shown in (E) of FIG. 4. The other constituent portions are common to the two embodiments, and so explanations are omitted.

The second spring means comprises a ring-shape wave spring 230, of size sufficient to surround the outer periphery of the lens barrel 40, as shown in (C) of FIG. 4. That is, the second spring means is configured by enclosing a ring-shape wave spring 230 between the spring means pressing face 63 of the feeding ring 250 and the face 24 of the spacer 20 on the side of the holder 70. Hence the ring-shape wave spring 230 can be formed to make contact with the face 24 of the spacer 20, and the spacer 20 can be pressed against this ring-shape wave spring 230. Similarly to cases in which the first spring means are used, when moving the lens retention housing 80 in back-and-forth motion relative to the holder 70 along the image capture lens optical axis (rotation axis) while rotating, the upper-side face 26 of the spacer 20 and the lower-side face 16 of the pressure cover 10 are always in plane contact when the lens retention housing 80 is rotated.

By thus adopting a ring-shape wave spring 230 as the second spring means in the second embodiment, the micro-coil spring mating holes 52, 54, 56, 58 which are formed in the feeding ring 50 of the first embodiment are not necessary in the feeding ring 250, as shown in (E) of FIG. 4.

Even when the ring-shape wave spring 230 is adopted as the second spring means, the ring-shape wave spring 230 and spacer 20 are in point contact. However, the spacer 20 and lens retention housing 80 are once again configured integrally by means of the linking hole 22 and linking rod 60, so that even when the lens retention housing 80 is rotated, the spacer 20 also rotates simultaneously by the same amount according to this rotation. Hence wear does not occur at the portion of the spacer 20 at which there is point contact between the ring-shape wave spring 230 and the spacer 20.

Figure 5:
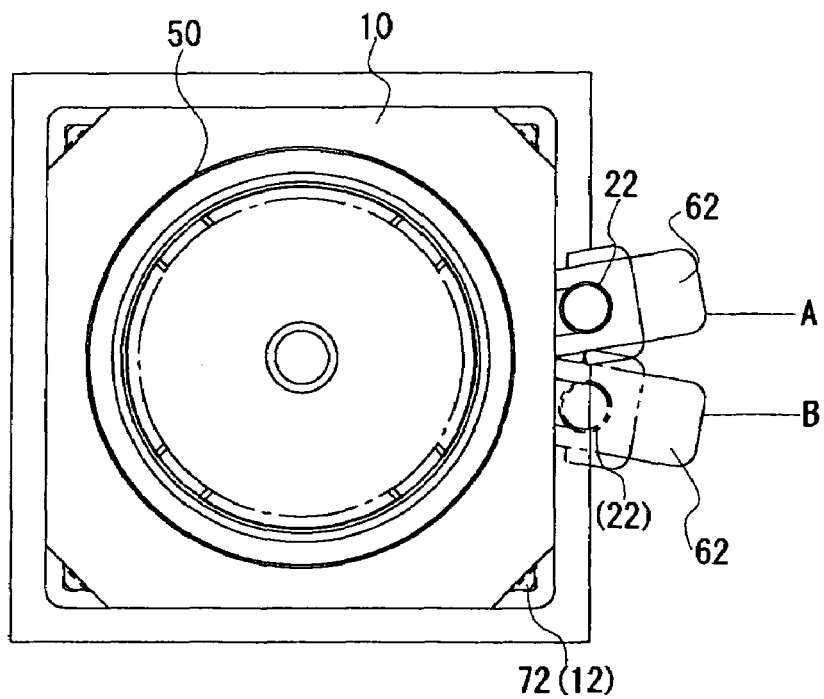
FIG. 5 is a plane view and partial cutaway cross-sectional view of the image capture lens feeding device of the second embodiment.
Figure 5:
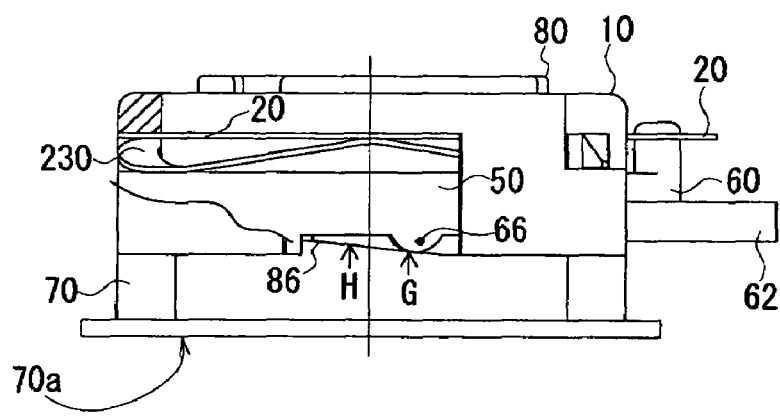

The configuration of the assembled state of the image capture lens feeding device of the second embodiment is explained, referring to (A) and (B) in FIG. 5. (A) in FIG. 5 is a plane view of the image capture lens feeding device of the second embodiment, seen from the image input side; (B) in FIG. 5 is a partial cutaway cross-sectional view seen from a direction perpendicular to the optical axis. In (A) of FIG. 5, differing from (A) in FIG. 3, a ring-shape wave spring of size sufficient to surround the outer periphery of the lens barrel 40 comprised by the second spring means 230 is not shown in the drawing; the second spring means 230 is shown in (B) of FIG. 5.

A characteristic of the second embodiment is the use of the ring-shape wave spring as the second spring means 230; other constituent portions are the same as in the first embodiment, and so redundant explanations are omitted.

Third Embodiment

Figure 6:
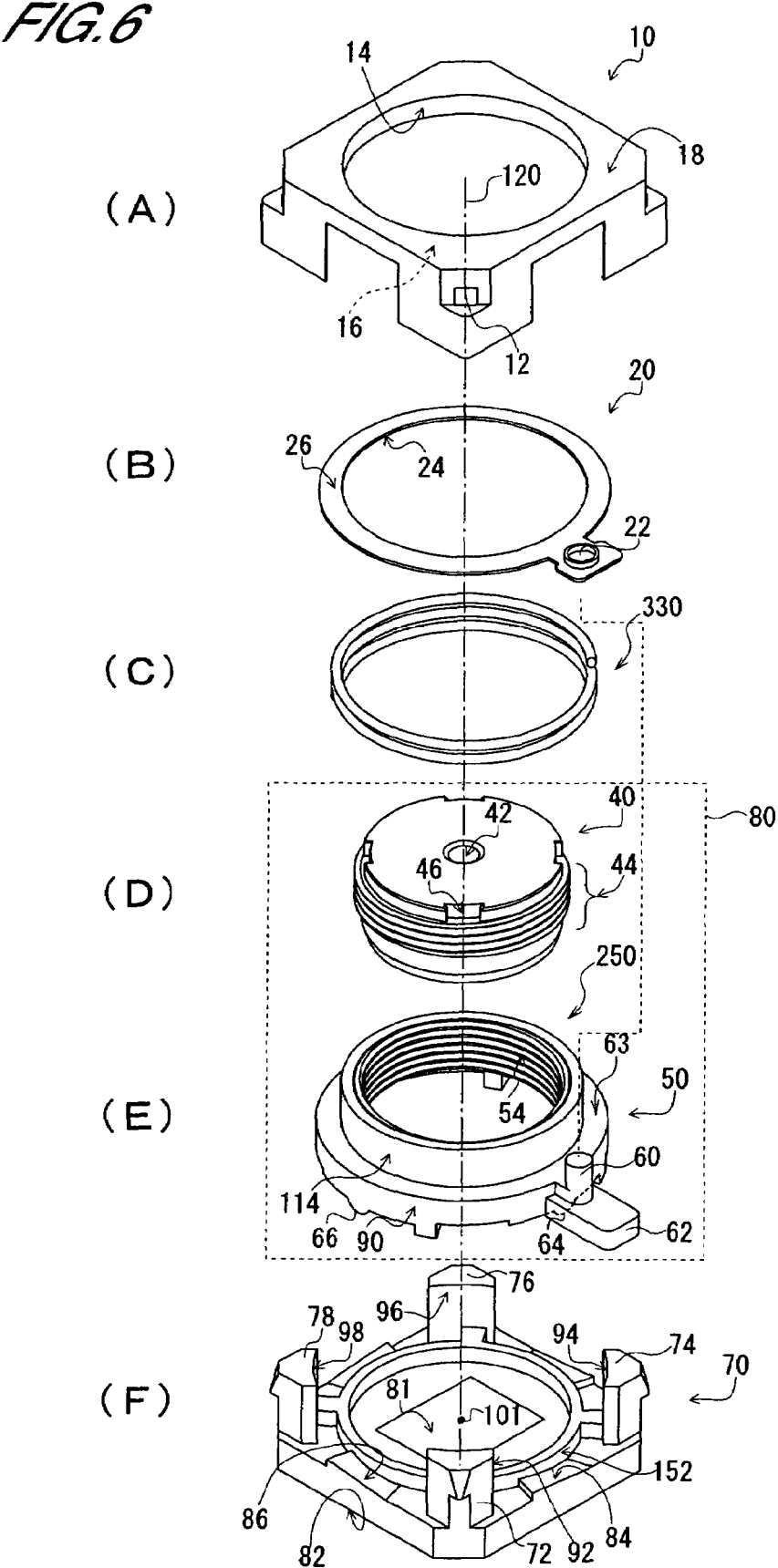
FIG. 6 is a summary exploded oblique view of the image capture lens feeding device of a third embodiment.

The configuration and operation of the image capture lens feeding device of a third embodiment are explained, referring to (A) through (F) in FIG. 6. (A) through (F) in FIG. 6 are a summary exploded oblique view of the image capture lens feeding device of the third embodiment; (A) shows a pressing cover 10, (B) shows a spacer 20, (C) shows a third spring means 330, (D) shows a lens barrel 40, (E) shows a feeding ring 250, and (F) shows a holder 70. A characteristic of the third embodiment is the third spring means, comprising a coil-type macro macro-coil spring 330, of size sufficient to surround the outer periphery of the lens barrel 40.

A difference from the first embodiment shown in (A) through (F) of FIG. 1 is the macro-coil spring 330, which is the third spring means, shown in (C) of FIG. 6. Further, the feeding ring 230 is the same as the feeding ring of the second embodiment; other constituent portions are common to the first and second embodiments, and so explanations are omitted. In using a coil-type macro-coil spring 330 to configure the third spring means, as shown in (E) of FIG. 6, the same feeding ring 250 as in the second embodiment can be used.

The third spring means comprises a macro-coil spring 330 of size sufficient to surround the outer periphery of the lens barrel 40, as shown in (C) of FIG. 6. That is, the third spring means is configured by enclosing a macro-coil spring 330 between the spring means pressing face 63 of the feeding ring 250 and the face 24 of the spacer 20 on the side of the holder 70. Hence the macro-coil spring 330 can be formed so as to make contact with the face 24 of the spacer 20, and the spacer 20 can be pressed by this third spring means. Moreover, similarly to the case in which the first spring means is employed, when causing the lens retention housing 80 to move in back-and-forth motion relative to the holder 70 along the image capture lens optical axis (rotation axis) while rotating, the lens retention housing 80 is always rotated in a state in which the upper face 26 of the spacer 20 and the lower face 16 of the pressing cover 10 are in plane contact.

In this way, even when a coil-type macro-coil spring 330 is adopted as the third spring means, the macro-coil spring 330 and spacer 20 are in point contact. However, the spacer 20 and lens retention housing 80 are once again configured integrally by means of the linking hole 22 and linking rod 60, so that even when the lens retention housing 80 is rotated, the spacer 20 also rotates simultaneously by the same amount according to this rotation. Hence wear does not occur at the portion of the spacer 20 at which there is point contact between the coil-type macro-coil spring 330 and the spacer 20.

Figure 7:
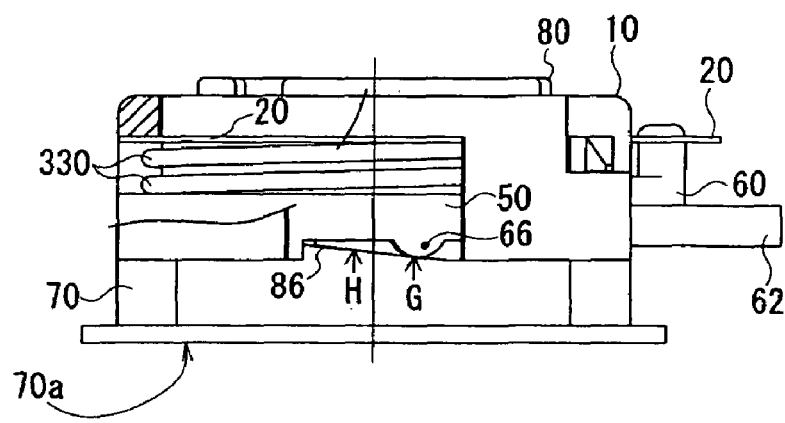
FIG. 7 is a partial cutaway cross-sectional view of the image capture lens feeding device of the third embodiment; and, FIG. 8 is a cutaway cross-sectional view resulting from cutting in the direction parallel to the optical axis direction of the feeding ring.

The configuration of the assembled state of the image capture lens feeding device of the third embodiment is explained, referring to FIG. 7. FIG. 7 is a partial cutaway cross-sectional view seen from a direction perpendicular to the optical axis.

A characteristic of the third embodiment is the use of the macro-coil spring 330 as the third spring means; other constituent portions are the same as in the first embodiment, and so redundant explanations are omitted.

The invention claimed is:

1. An image capture lens feeding device, comprising:
   a lens retention housing, comprising a lens group constituting an image capture lens, with the optical axis of said lens group being coincident with a rotation axis, and enabling back-and-forth motion of said lens group along said rotation axis while rotating;
   a holder, slidably coupled with said lens retention housing and holding said lens retention housing, and comprising in the center portion a window through which light transmitted by said image capture lens passes;
   a cam mechanism, comprising first cam means which is provided in said lens retention housing, and second cam means which is provided on said holder and which slips relative to said first cam means;
   a pressing cover coupled with said holder;
   a spacer which rotates about said rotation axis integrally with said lens retention housing, in plane contact with said pressing cover, and which is coupled with said lens retention housing without impeding said back-and-forth motion of said lens retention housing; and,
   spring means inserted between said lens retention housing and said spacer, in pressing contact with said first cam means and with said second cam means by rotating said lens retention housing with respect to said holder, said lens retention housing can be moved back and forth with respect to said holder,
   wherein said spring means comprises at least two micro-coil springs arranged at a distance from each other, one end of each of said micro-coil springs is fixed to either said lens retention housing or to said spacer, and said micro-coil springs are configured so as to press against said spacer.

2. An image capture lens feeding device, comprising:
   a lens retention housing, comprising a lens group constituting an image capture lens, with the optical axis of said lens group being coincident with a rotation axis, and enabling back-and-forth motion of said lens group along said rotation axis while rotating;
   a holder, slidably coupled with said lens retention housing and holding said lens retention housing, and comprising in the center portion a window through which light transmitted by said image capture lens passes;
   a cam mechanism, comprising first cam means which is provided in said lens retention housing, and second cam means which is provided on said holder and which slips relative to said first cam means;
   a pressing cover coupled with said holder;
   a spacer which rotates about said rotation axis integrally with said lens retention housing, in plane contact with said pressing cover, and which is coupled with said lens retention housing without impeding said back-and-forth motion of said lens retention housing; and,
   spring means inserted between said lens retention housing and said spacer, in pressing contact with said first cam means and with said second cam means by rotating said lens retention housing with respect to said holder, said lens retention housing can be moved back and forth with respect to said holder,
   wherein said spring means comprises at least two micro-coil springs arranged at a distance from each other, micro-coil spring mating holes are formed in a number equal to the number of said micro-coil springs in said lens retention housing, one end of each of said micro-coil springs is inserted into each one of said micro-coil spring mating holes, and the other end of each of said micro-coil springs is in contact with said spacer and presses against said spacer.

3. An image capture lens feeding device, comprising:
   a lens retention housing, comprising a lens group constituting an image capture lens, with the optical axis of said lens group being coincident with a rotation axis, and enabling back-and-forth motion of said lens group along said rotation axis while rotating;
   a holder, slidably coupled with said lens retention housing and holding said lens retention housing, and comprising in the center portion a window through which light transmitted by said image capture lens passes;
   a cam mechanism, comprising first cam means which is provided in said lens retention housing, and second cam means which is provided on said holder and which slips relative to said first cam means;
   a pressing cover coupled with said holder;
   a spacer which rotates about said rotation axis integrally with said lens retention housing, in plane contact with said pressing cover, and which is coupled with said lens retention housing without impeding said back-and-forth motion of said lens retention housing; and,
   spring means inserted between said lens retention housing and said spacer, in pressing contact with said first cam means and with said second cam means by rotating said lens retention housing with respect to said holder, said lens retention housing can be moved back and forth with respect to said holder,
   wherein said spring means comprises a ring-shape wave spring, of size sufficient to surround the outer periphery of said lens retention housing, and said ring-shape wave spring is configured so as to be enclosed between the spring pressing face of said lens retention housing and the face of said spacer on the side of said holder.

4. An image capture lens feeding device, comprising:
   a lens retention housing, comprising a lens group constituting an image capture lens, with the optical axis of said lens group being coincident with a rotation axis, and enabling back-and-forth motion of said lens group along said rotation axis while rotating;
   a holder, slidably coupled with said lens retention housing and holding said lens retention housing, and comprising in the center portion a window through which light transmitted by said image capture lens passes;
   a cam mechanism, comprising first cam means which is provided in said lens retention housing, and second cam means which is provided on said holder and which slips relative to said first cam means;
   a pressing cover coupled with said holder;
   a spacer which rotates about said rotation axis integrally with said lens retention housing, in plane contact with said pressing cover, and which is coupled with said lens retention housing without impeding said back-and-forth motion of said lens retention housing; and,
   spring means inserted between said lens retention housing and said spacer, in pressing contact with said first cam means and with said second cam means by rotating said lens retention housing with respect to said holder, said lens retention housing can be moved back and forth with respect to said holder,
   wherein said spring means comprises a macro-coil spring, of size sufficient to surround the outer periphery of said lens retention housing, and said macro-coil spring is configured so as to be enclosed between the spring pressing face of said lens retention housing and the face of said spacer on the side of said holder.

5. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing; and, spring means inserted between said lens retention housing and said spacer, in pressing contact with said first cam means and with said second cam means by rotating said lens retention housing with respect to said holder, said lens retention housing can be moved back and forth with respect to said holder, wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

6. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing; and spring means inserted between said lens retention housing and said spacer, in pressing contact with said first cam means and with said second cam means by rotating said lens retention housing with respect to said holder, said lens retention housing can be moved back and forth with respect to said holder, wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, and wherein said feeding ring is provided with an operation knob directed outwards, at one place on the outer-periphery face of said feeding ring, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

7. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing; and, spring means inserted between said lens retention housing and said spacer, in pressing contact with said first cam means and with said second cam means by rotating said lens retention housing with respect to said holder, said lens retention housing can be moved back and forth with respect to said holder, wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, wherein said feeding ring is optionally provided with an operation knob directed outwards, at one place on the outer-periphery face of said feeding ring, and wherein a groove is formed in said lens barrel for mounting of a tool to cause rotation with respect to said feeding ring, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

8. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing;

spring means inserted between said lens retention housing and said spacer, in pressing contact with said first cam means and with said second cam means by rotating said lens retention housing with respect to said holder, said lens retention housing can be moved back and forth with respect to said holder; and an optical axis retention mechanism which is configured by providing sliding coupling portions between said pressing cover and said lens retention housing, and between said holder and said lens retention housing, and which enables back-and-forth motion of said lens retention housing along said optical axis while maintaining said optical axis, wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, wherein said feeding ring is optionally provided with an operation knob directed outwards, at one place on the outer-periphery face of said feeding ring, and wherein a groove is optionally formed in said lens barrel for mounting of a tool to cause rotation with respect to said feeding ring, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

9. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing;

spring means inserted between said lens retention housing and said spacer, in pressing contact with said first cam means and with said second cam means by rotating said lens retention housing with respect to said holder, said lens retention housing can be moved back and forth with respect to said holder; and an optional optical axis retention mechanism which is configured by providing sliding coupling portions between said pressing cover and said lens retention housing, and between said holder and said lens retention housing, and which enables back-and-forth motion of said lens retention housing along said optical axis while maintaining said optical axis, wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, wherein said feeding ring is optionally provided with an operation knob directed outwards, at one place on the outer-periphery face of said feeding ring, and wherein a groove is optionally formed in said lens barrel for mounting of a tool to cause rotation with respect to said feeding ring, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

10. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing; and, spring means inserted between said lens retention housing and said spacer, in pressing contact with said first cam means and with said second cam means by rotating said lens retention housing with respect to said holder, said lens retention housing can be moved back and forth with respect to said holder, wherein said first cam means is a cam face, and said second cam means is a cam protrusion, and wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

11. A method of assembly of an image capture lens feeding device, said image capture lens feeding device comprising:

a lens retention housing, comprising a lens group constituting an image capture lens, with the optical axis of said lens group being coincident with a rotation axis, and enabling back-and-forth motion of said lens group along said rotation axis while rotating;

a holder, slidably coupled with said lens retention housing and holding said lens retention housing, and comprising in the center portion a window through which light transmitted by said image capture lens passes;

a cam mechanism, comprising first cam means which is provided in said lens retention housing, and second cam means which is provided on said holder and which slips relative to said first cam means;

a pressing cover coupled with said holder;

a spacer which rotates about said rotation axis integrally with said lens retention housing, in plane contact with said pressing cover, and which is coupled with said lens retention housing without impeding said back-and-forth motion of said lens retention housing; and, spring means inserted between said lens retention housing and said spacer, in pressing contact with said first cam means and with said second cam means by rotating said lens retention housing with respect to said holder, said lens retention housing can be moved back and forth with respect to said holder, wherein said first cam means is a cam protrusion, and said second cam means is a cam face, and wherein the said lens retention housing further comprises a lens barrel which incorporates said lens group constituting an image capture lens, and on the outer periphery of which is formed a single-thread male screw; and a feeding ring on the inner periphery of which is formed a single-thread female screw which screws together with said single-thread male screw, said method of assembly comprising the steps of:

screwing together said lens barrel and said feeding ring and forming an unfixed lens retention housing in a state in which said lens barrel can be rotated with respect to said feeding ring;

causing said unfixed lens retention housing to slidably couple with said holder, and provisionally fixing at either the most distant position, or at the closest position, relative to the image plane of said image capture lens;

adjusting focusing to cause the image of said image capture lens to be focused in said image plane, by rotating said lens barrel with respect to said feeding ring; and, in the state in which the focusing adjustment has been completed, bonding and fixing said lens barrel and said feeding ring, and forming said lens retention housing.

* * * * *